May 25, 1965
G. LEUCCI
3,185,153
AUTOMATIC REGULATING DEVICE FOR
BLADDER IRRIGATION DEVICES
Filed April 16, 1962
5 Sheets-Sheet 1
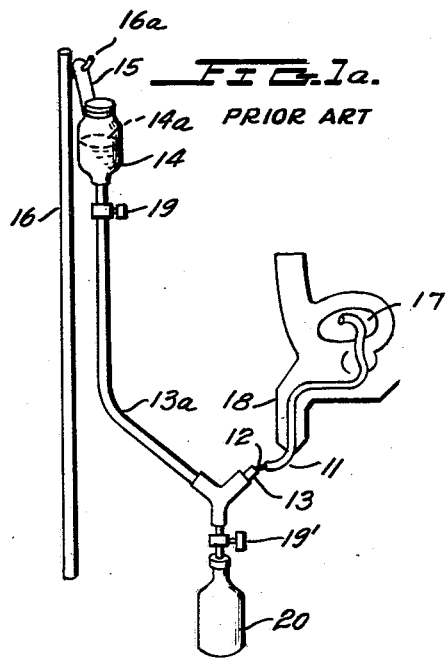
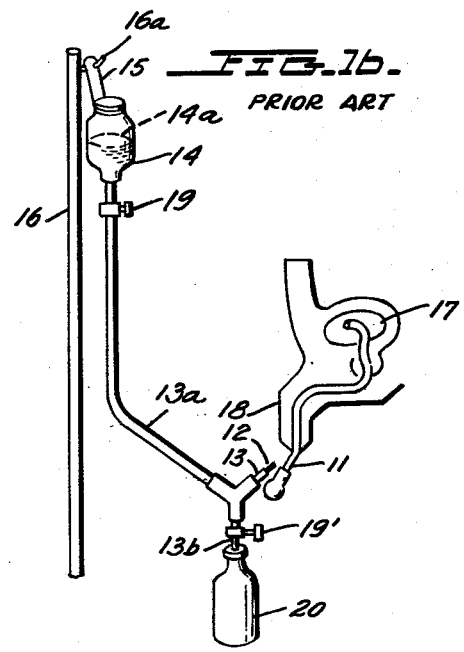
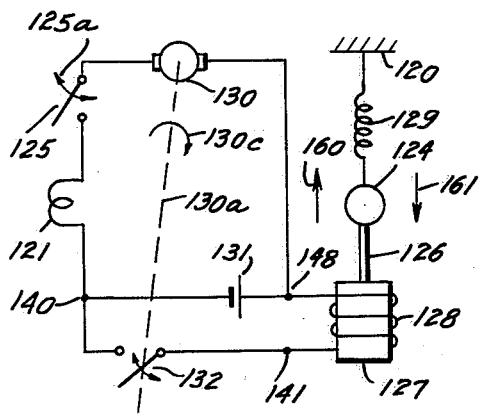
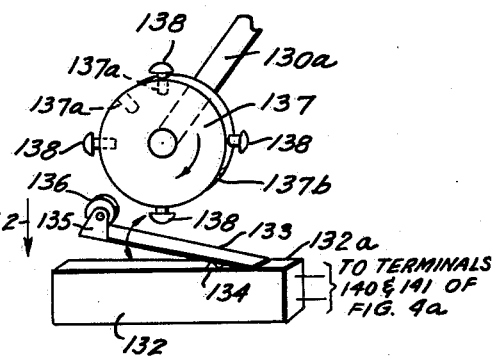
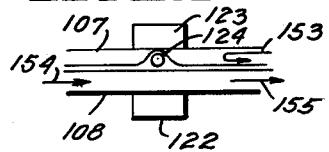
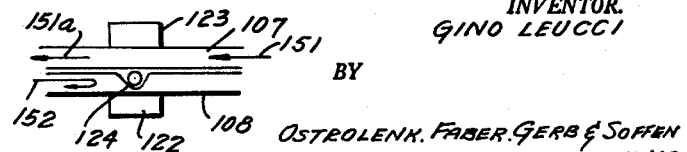
INVENTOR.
GINO LEUCCI
BY
OSTROLENK, FABER, GERB & SOFFEN
ATTORNEYS

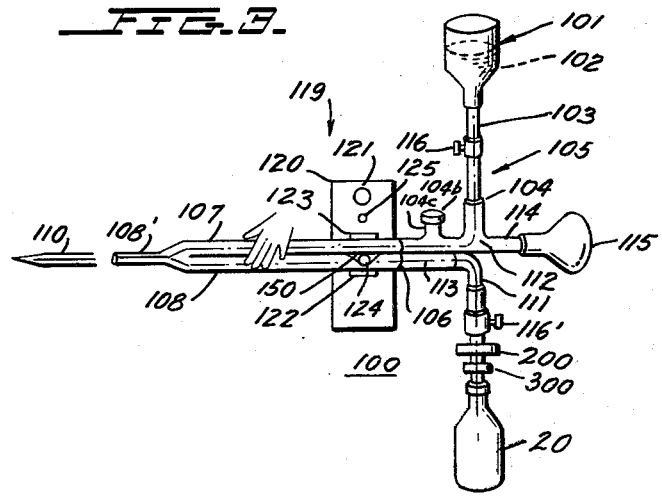
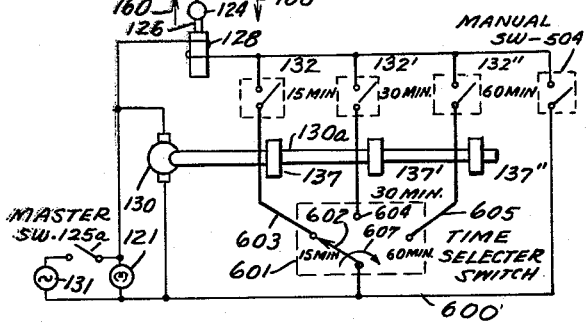
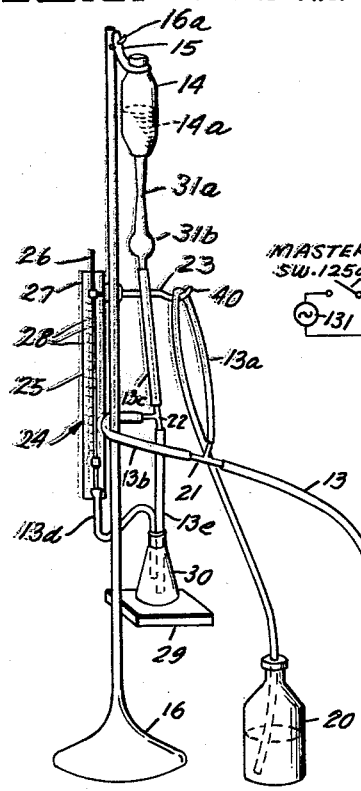

May 25, 1965
G. LEUCCI
3,185,153
AUTOMATIC REGULATING DEVICE FOR
BLADDER IRRIGATION DEVICES
Filed April 16, 1962
5 Sheets-Sheet 3
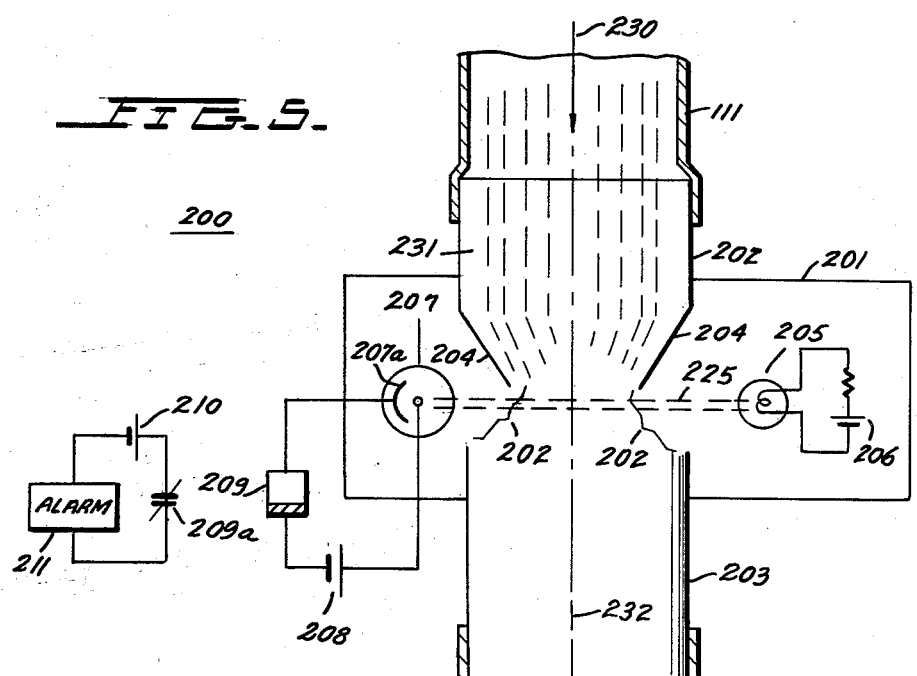
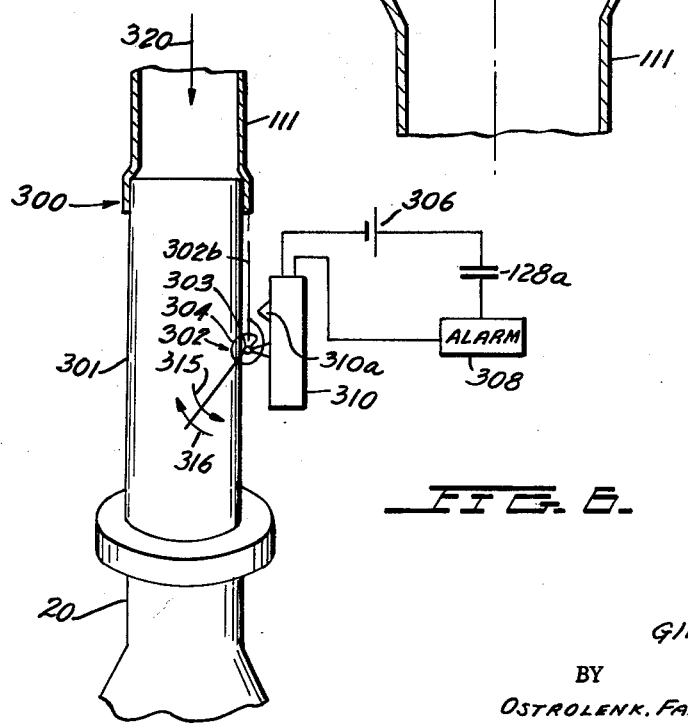
INVENTOR.
GINO LEUCCI
BY
OSTROLENK, FABER, GERB & SOFFEN
ATTORNEYS

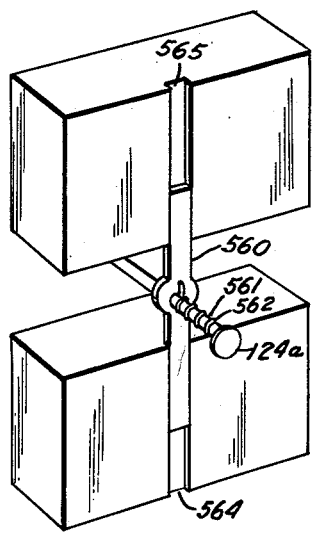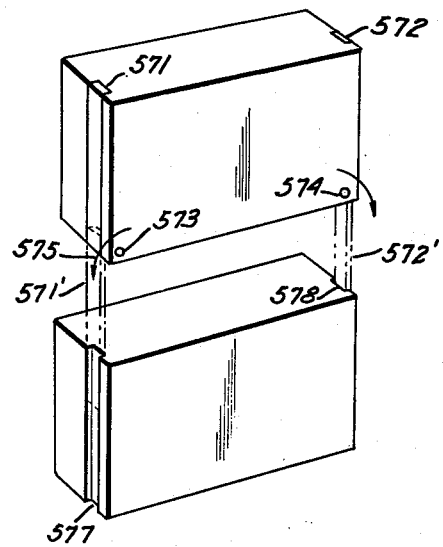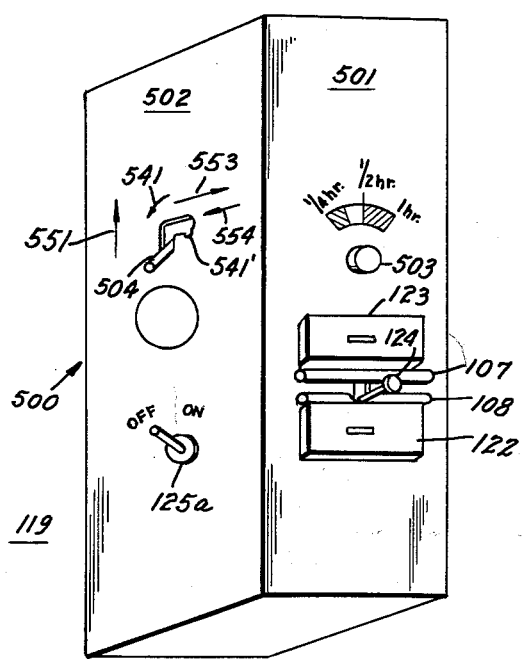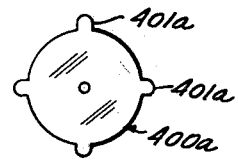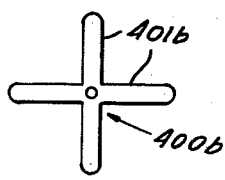
INVENTOR.
GINO LEUCCI
BY
OSTROLENK, FABER, GERB & SOFFEN
ATTORNEYS

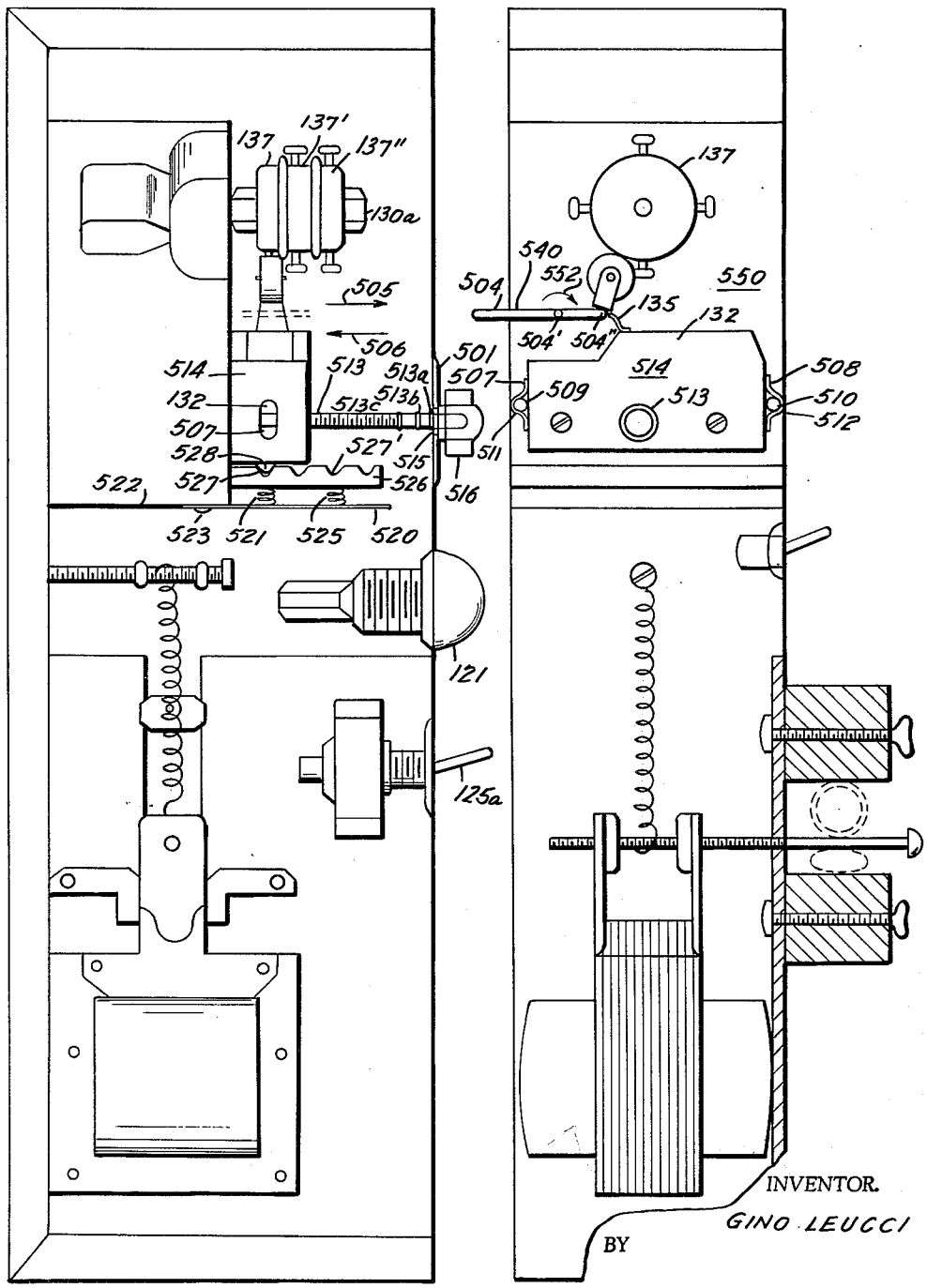

3,185,153
AUTOMATIC REGULATING DEVICE FOR BLADDER IRRIGATION DEVICES
Gino Leucci, 1022 Wakeling St., Philadelphia, Pa.
Filed Apr. 16, 1962, Ser. No. 187,720
19 Claims. (Cl. 128—227)

My invention relates to surgical irrigation apparatus, and more particularly to irrigation apparatus having a novel automatic control means and a means to facilitate the removal of blood-clots which may occur during the automatic irrigation operation.

Irrigation quite often becmes necessary as a postoperative procedure for operations involving the urinary bladder and the prostate gland. During the healing process of the affected organ, undesirable formations are formed which must be removed from the system by sterile methods.

The procedure which is normally used is that of catheterization; that is, the introduction of a catheter into the bladder into which a sterile fluid is injected to properly cleanse the bladder and the organs connected thereto. The sterile fluid is then drained from the system by gravity.

Another procedure in which the irrigation operations must first be performed is that of cystoscopy, which is the examination of the urinary bladder by means of an instrument known as the cystoscope.

The irrigation procedure is also utilized as a method for treating the urinary bladder in cases where surgery is not performed, such as, for example, in chronic infections, paralytic bladder, etc.

One method which is presently used to irrigate the urinary bladder involves the introduction of a sterile fluid into the bladder by means of a catheter until a predetermined amount of fluid is introduced into the bladder. This is simply a gravity-feed operation. The tube which connects the catheter to the fluid source has a branch leading to a waste container. The branch path clamp is closed during the period that the fluid is introduced into the bladder. When the bladder is satisfactorily irrigated, the fluid source is then closed off from the tube connecting the source to the catheter and the branch path, which is at a level which is lower than that of the bladder, causes the fluid in the bladder to be drained off from the bladder by gravity and placed into a container for either disposal or for subsequent examination. It is extremely important to provide an irrigation set-up which is kept completely sterile so that no pathogenic material is introduced into the patient's body during the irrigation operation, which material might have harmful effects upon the patient.

Another irrigation method presently in use employs what is commonly known as a tidal drainage set-up. This apparatus permits the continuous introduction and drainage of the fluid automatically. The bladder is filled to a predetermined point by gravity-feed means. At this predetermined point the intracystic pressure of the urinary bladder causes a vacuum which is formed in the apparatus to be automatically broken, whereupon the bladder is then emptied by siphonage. The irrigation step is not reinitiated until the bladder is completely drained of the sterile fluid, at which time the irrigation step automatically begins. The process is repeated in a regular cycle until the sterile fluid supply is depleted.

The intermittent and the continuous or tidal drainage operations have the disadvantage of requiring cessation of the irrigation operation upon the occurrence of an obstruction in the catheter due to the presence of bloodclots or mucous which are being washed away under the cleansing pressure of the sterile fluid. In order to reinitiate normal flow of the sterile fluid through the urinary bladder, it becomes necessary to remove the fluid source from the tube connecting the fluid source to the catheter and connect the tube to a flexible hand pump or bulb, capable of developing a vacuum of the magnitude necessary to release the obstruction. The fluid source is then re-connected to the tube, permitting the irrigation process to be resumed. A similar operation is necessary to release an obstruction arising in the continuous or tidal drainage set-up.

Intermittent interruptions of this nature due to obstructions which occur in the irrigation apparatus cause large amounts of fluid to escape from the flexible connecting tubes during the time that the fluid source is removed and replaced by the hand pump. The escaping fluid dampens the bed sheets, the patient's bed clothes and possibly the operator, necessitating a complete change of the bed sheets and bed clothing. In addition, the need for disengaging the fluid source from the catheter destroys the isolation of the system from the surrounding elements which exist prior to the obstruction removal operation. The need for such isolation from the surrounding elements is highly important, since the harmful effects which may occur due to the introduction of pathogenic substances into the patient's internal system is especially serious due to the patient's weakened condition.

Since the irrigation procedure is repeated in a periodic fashion dependent upon the condition of the patient, it becomes the burdensome duty of the nurse to reinitiate the irrigation cycle in the regular irrigation set-up every time a subsequent irrigation cycle is desired. This manual operation has the disadvantage of putting the patient to the expense of a private nurse during the evening hours as well as placing an added burden upon the day nurse who must constantly check both the irrigation set-up and the patient.

The tidal drainage set-up, which produces any automatic operation controlled by the pressure values within the set-up, has the advantage over the regular irrigation set-up in this respect, but nevertheless lacks the means for adjusting the length of the repetitive cycle of the operation. That is, once the solution is drained from the bladder being treated, it is immediately flooded by sterile fluid. No means presently known is provided for adjusting this cycle.

The irrigation device of my invention is so arranged as to provide complete isolation for the surrounding environment throughout the entire irrigation operation, regardless of whether the apparatus is to be used for either continuous or intermittent irrigation. The isolation feature provided by my apparatus is not destroyed upon the occurrence of an obstruction due to the passage of blood-clot or mucous through the apparatus. Further electro-mechanical means is provided for automatically initiating the irrigation cycle, controlling the length of the cycle and controlling the amount of time elapsed between the end of a cycle and the start of the subsequent cycle. The operating period is adapted to cover periods over a full day in elapsed time.

My invention comprises an inlet tube for receiving the fluid source, and an outlet tube through which the fluid may be siphoned after passing through the urinary bladder. Other connections are provided for a hand pump and a catheter respectively. The tubular portions adjacent the catheter are formed of a flexible material of relatively large diameter, which may be utilized to aid in the removal of relatively small blood-clots. The hand pump is provided for removal of larger blood-clots which will not respond to the manipulation of the tubular portion adjacent the catheter. Since the entire apparatus is formed of flexible tubing, it may be conveniently folded into a compact package, thereby facilitating storage, shipment and handling of the apparatus. The simplicity of the apparatus makes it readily usable by anyone without the need for lengthy, complex instruction.

The electro-mechanical control means is comprised of an electrically controlled reciprocating member, which is positioned between two opposed stationary members. The parallel tubing is positioned with respect to the reciprocating member to cause one of said tubes to be clamped, while the other is unobstructed when the reciprocating member is in a first position and to cause the tubular members to reverse their states when the reciprocating member moves to a second position.

The first position causes the bladder to be flooded for a predetermined period. The second position causes the flooding to be terminated and the drainage of the bladder to be initiated. The electro-mechanical control means is further adapted to permit any desired amount of time to elapse between termination of the drainage operation and initiation of the next flooding or irrigation of the bladder being treated. This arrangement completely avoids the necessity of a nurse for periodic manipulation of the irrigation set-up.

If for any reason an obstruction occurs in the set-up, the tubular portions adjacent the catheter are arranged so as to be substantially physically parallel to each other, permitting their manual manipulation for the purpose of creating a sucking action to remove any obstruction present in the apparatus. Their inner diameters are greater than the catheter inner diameter, permitting blood-clots of any size to easily pass through.

During the course of the drainage operation, it is possible that the patient may suffer, for reasons either known or unknown, substantial internal bleeding. Under such circumstances the blood discharged will pass through the drainage apparatus into the waste container. Since this is a condition of great significance, it is important that the hospital medical authorities be immediately apprised of this situation. Means have thereby been provided in combination with the irrigation set-up, which has the ability to discriminate between the clear sterile fluid which is passed to the waste container and the blood discharged from the urinary bladder to the waste container, in order to produce an appropriate alarm signal for recognizing this condition. This means consists of a light source-photo cell arrangement which, upon the occurrence of a situation where blood is being discharged through the irrigation apparatus, is able to recognize this situation and apprise the authorities of this immediately, by means of either a visible or audible alarm.

It can also be appreciated that during the irrigation cycles, a clotting action may occur, so that no fluid which is in the bladder will pass through the irrigation set-up to the waste container, thus placing the bladder under a severe stress by being forced to hold all of the fluid and prevent it from passing this fluid due to the clotting condition which exists within the patient's body. Since such a condition must be immediately alleviated, a second alarm means is provided for apprising the hospital authorities of this situation. This indicating means consists of a switch normally closed arrangement, which is actuated by a lever. This lever is controlled by the fluid flow to the waste container, causing the lever to deflect, thereby opening the switch. In this position the alarm circuit is in the open condition, as no alarm is necessary, this being the normal situation. However, if fluid fails to flow through the irrigation set-up to the waste container, the lever will not be deflected, causing the alarm circuit to remain in a closed position, thereby actuating the alarm means. A time delay mechanism is employed in conjunction with the fluid-actuated lever, in order to provide the proper timing of the alarm circuit, so as to prevent premature and/or unnecessary actuation of the alarm means.

It should be noted that both the blood discriminating means and the fluid controlled lever means are arranged to generate their alarm signals when the irrigation apparatus is in the drainage position. When either the bleeding or clotting conditions are observed and subsequently corrected it becomes necessary then to have the ability to produce an immediate flooding action in order to cleanse the bladder. Manual means are thereby provided for this purpose which means is adapted to actuate the electromechanical control means regardless of the position of the periodic actuating means. Locking means are provided for the manual means enabling the manual means to be locked into the initiating position to produce a flooding operation of the desired time period.

The electromechanical control means including a movably mounted manually controllable microswitch member which cooperates with the rotating discs of the electromechanical means to control the draining and flooding operations. A plurality of such disc means are provided which are secured to a common rotating means. Each disc cooperates with the microswitch member to produce a cycling period which is different from each of the other discs. Keying means are provided which cooperate with the movably mounted microswitch member to key or lock the microswitch member into a plurality of discrete positions wherein each position places the microswitch member in cooperative relationship with a distinctive disc member, thus slidably positioning the microswitch member by means of a manually operable knob. Any cycling period of the total number of cycling periods available may be selected.

In order that the irrigation control means be enabled to accommodate flexible tubing of a variety of different sizes and also to accommodate new flexible tubing when the irrigation apparatus is to be employed on a new patient, securing means are provided which cooperates with the stationary members through which the flexible tubing is inserted so as to retain the flexible tubing between the stationary members and under control of the valve means. The securing means is spring loaded to permit release thereof for renewal and/or insertion of the flexible tube members.

The tubular portions may be designed to have tapered inner diameters so as to regulate the magnitude of the sucking action depending only upon which point the tubular portions are gripped. As another modification, the tubular members may be designed to each have bulbar portions adjacent one another to create a sucking action greater in magnitude than that which is created by manipulating the remaining adjacent portions of the tubular members.

It is therefore one object of my invention to provide an automatically controlled irrigation device having a novel design to prevent the introduction of foreign matter into the irrigation set-up during the irrigation operation.

Another object of my invention is to provide a novel automatically controlled irrigation system having first and second fluid conveying members which are hydraulically and physically arranged in parallel fashion to aid in the removal of obstructions occurring in the apparatus.

Still another object of my invention is to provide an automatically controlled closed system for irrigating a bladder, wherein novel means are provided to remove obstructions occurring in the system, thus avoiding the need for interrupting the isolation of the system from its surroundings for the removal of an obstruction occurring therein.

Another object of my invention is to provide an automatically controlled irrigation apparatus having novel means for removing blood-clots which may disturb the irrigation operation.

Another object of my invention is to provide an automatically controlled irrigation apparatus which includes first means for removing relatively small blood-clots and second means for removing larger blood-clots which may be introduced into the apparatus during the irrigation operation, thus eliminating the need for a catheterization tray each time an obstruction occurs.

Another object of my invention is to provide an irrigation apparatus having novel automatic control means for regulating the elapsed times of the irrigation operation and drainage operation and for regulating the period between the termination of the drainage operation and the start of the irrigation operation.

Still another object of my invention is to provide an irrigation apparatus having electro-mechanical control means for automatically regulating the flooding cycle, the drainage cycle and the elapsed time therebetween of the apparatus.

Another object of my invention is to provide an irrigation apparatus having electro-mechanical controlled means for automatically regulating the flowing cycle, and further including means for discriminating between a normal and a bloody fluid discharge.

Another object of my invention is to provide an irrigation apparatus having electromechanical controlled means for automatically regulating the flooding cycle, which further includes a fluid controlled lever mechanism for identifying a clotting situation which occurs in the body of the patient.

Still another object of my invention is to provide an irrigation apparatus having electromechanical controlled means which is further provided with signal changing means for regulating the period of occurrence of the flooding cycles.

Another object of my invention is to provide an irrigation apparatus having electromechanical controlled means for automatically regulating the flooding cycle and which further includes a manually settable flooding cycle initiating means whenever it is desired to generate a flooding operation at a time other than the regular flooding cycles.

Still another object of my invention is to provide an irrigation apparatus having electromechanical controlled means for automatically regulating the flooding cycle wherein the controlled means housing includes means for removably securing the irrigation apparatus flexible tubing to the controlled means.

Another object of my invention is to provide an automatically controlled irrigation apparatus which is extremely light in weight and which may be used by anyone without the need for lengthy, complex instruction.

These and other objects of my invention will become apparent in the following description and claims taken in conjunction with the accompanying drawings in which:

FIGURES 1a and 1b show the intermittent drainage operation of the prior art.

FIGURE 2 shows the tidal drainage apparatus of the prior art.

FIGURE 3 shows the apparatus of my invention used in the automatic drainage operation.

FIGURE 4a is a schematic diagram of the electronic control means shown in FIGURE 3 of the drawings.

FIGURE 4b is a perspective view of the switch arrangement shown in FIGURE 4a.

FIGURES 4c and 4d are partial views of the irrigation set-up of FIGURE 3, showing the flooding and drianage positions respectively of the irrigation set-up.

FIGURE 5 shows a detailed cross-sectional view of the discharge discriminating means shown in the irrigation set-up of FIGURE 3.

FIGURE 6 shows a detailed cross-sectional view of the flood controlled lever means shown in the irrigation set-up of FIGURE 3.

FIGURE 7 shows a perspective view of the housing for the controlled means of FIGURE 4a.

FIGURES 8a and 8b are front and side elevational views respectively of the arrangement shown in FIGURE 7 with portions of the housing removed to reveal the contents thereof.

FIGURES 9 and 9a show two alternative embodiments for the rotating disc of the electromechanical means shown in FIGURES 4b, 8a and 8b.

FIGURES 10 and 11 show two alternative embodiments for securing the flexible tubing means shown in FIGURE 7.

FIGURE 12 shows an alternative embodiments for the timing selection arrangement of FIGURES 8a and 8b.

Referring now to the drawings, FIGURE 1a shows an intermittent irrigation apparatus which consists of a flexible catheter 11, flexible tubing 13 and 13a, and a sterile container 14 which contains the fluid 14a used to drain the urinary bladder 17. Many solutions are used for irrigation of the bladder, depending upon the disease affecting the organ. One exemplary solution is the normal saline solution which is supplied to hospitals in sterile bottles of 1,000 cc. capacity. Another typical solution employed in the irrigation operation in acetyl-betamethylcholine chloride which is a parasympathetic nerve stimulant useful in the treatment of bladder dysfunction characterized by urinary retention due to hypotonia of the detrusor muscles and spasm of the sphincters. Other fluids may be used, depending upon the treatment needed by the individual patient and the above solutions are set forth merely as exemplary sterile fluids.

When the catheter 11 is properly introduced into the bladder 17 through the male organ 18, the flexible tube 13a is then connected to the catheter 11 by means of a piece of straight connecting tubing 12, tubing 13 and Y-shaped connector 35. The fluid container 14 is supported by stand 16 having a hood 16a which engages the strap 15 surrounding the neck of container 14. Clamp 19 is initially adjusted to prevent flow of the solution 14a while the apparatus is being set-up.

As soon as the apparatus is properly set-up, clamp 19 may be loosened, permitting the fluid 14a to flow downward under control of the force of atmospheric pressure into the urinary bladder 17. The fluid 14a is prevented from flowing into waste container 20 by closing clamp 19 on tubing 13b.

When the bladder 17 is completely filled with solution 14a, the bladder 17 is drained by closing clamp 19 to stop the flow of fluid 14a and opening valve 19 on tubing 13b. The intravesicle pressure urges the fluid into waste container 20. Irrigation may be resumed by opening valve 19 and releasing valve 19.

Upon the occurrence of blood clots or mucus in the foley catheter 11 due to the cleansing properties of the solution, the catheter dimensions prevent the unobstructed flow of the solution 14a requiring removal of the obstruction.

To remove the obstruction, tubing 13 is separated from straight connecting tubing 12 and is replaced by hand pump or syringe 115, as shown in FIGURE 1b. By squeezing and releasing hand pump 36, a suction is created to withdraw the obstructions. Upon removal of the obstruction, the apparatus may be rearranged as shown in FIGURE 1a for resumption of the irrigation process. In addition to syring 115 a quantity of sterile fluid from another source (not shown) is needed in the withdrawal operation in order that a sufficient amount of fluid is present in the syringe 115, tube 13 and catheter 11 during the removal operation of the obstruction.

The separation of tube 13 from straight tubing 12 for the purpose of inserting syringe 115 destroys the isolated condition of the apparatus which must be kept sterile throughout the irrigation operation in order to shield the patient from infection. Also the set-up requires regular supervision in order to reinitiate the complete irrigation operation each time another cycle is required, thus placing a rather heavy burden upon the supervising party.

The tidal drainage operation comprises filling and emptying of the urinary bladder such as is performed by the prior art apparatus shown in FIGURE 2. The set-up consists of a sterile fluid container 14 which is supported by strap 15 and hook 16a to stand 16. The lower end of fluid container 14 is connected to a flutter valve 31a and dropper 31b which is, in turn, connected to a reservoir 30 by tube 13c, T-shaped tubing 22 and tube 13e. Flutter valve 31a and dropper 31b act to regulate the rate of flow of the sterile solution 14a. Catheter 11 is connected to the fluid source and T-shaped tubing 22 by means of tubing 13b, T-shaped tube 21, tubing 13 and straight connecting tubing 12. A waste container 20 is connected to T-shaped tube 21 by tubing 13a which is looped over support 23 for a purpose to be more fully described.

Manometer 24, having a transparent tube 25 which is open at end 26, is mounted to a panel 27 having gradations 28, and is connected to reservoir 30 by tubing 13e. Manometer 24 is utilized to measure intracystic pressure of the bladder.

The operation of the tidal drainage apparatus shown in FIGURE 2 is as follows: The solution 14a in container 14 moves downward by gravity through flutter valve 31a and dropper 31b, tubing 13c and 13e, in order to fill up reservoir 30. Reservoir 30 is filled as is tube 13e and tube 25 of manometer 24 up to the level of T-shaped tube 22. When the fluid reaches the level of tube 22, it will then move downward by gravity through tube 13b, T-tube 21, tube 13 and tube 12 through catheter 11 into the urinary bladder 17. This flow will continue until urinary bladder 17 is completely filled with sterile solution 14a. At this time, the pressure exerted by the bladder 17 upon the sterile solution is greater than exerted by the fluid 14a, causing the sterile fluid to rise both in the tube 25 and manometer 24 and in tube 13a. As soon as the level of fluid 14a is sufficiently high to reach the point 40 of tubing 13a and then siphoned down tube 13a into waste container 20, a vacuum builds up in tubing 13a causing the sterile fluid which is in the urinary bladder 17 to be completely drained into waste container 20. At this time the pressure existing in the urinary bladder 17 is substantially less than the pressure of the fluid, causing the fluid source 14 to resume its flow downward through flutter valve 31a and dropper 13b. This initiates the irrigation of urinary bladder 17. This alternate irrigation and siphonage is a continuously repetitive cycle, and is terminated only by the depletion of the fluid 13a in container 14. The height 40 of tubing 13a may be moved up or down by adjusting bracket 23, depending upon the intravesicle pressure which is desired in the irrigation of any particular patient. Here we have the same disadvantage seen in the intermittent irrigation system in that the set-up must be partially dismantled for removal of an obstruction within the system.

Another disadvantage of the tidal drainage set-up is that the refilling of the bladder 17 is begun immediately after the bladder is drained due to the absence of any intravesicle pressure in the bladder 17 for overcoming the force exerted upon the sterile fluid 14a in the container 14 by gravity. This mode of operation prevents the adjustment or control of the elapsed time between the termination of the drainage phase and the initiation of the flooding phase of the irrigation operation.

The irrigation apparatus as shown in FIGURE 2 appears to be a completely sterile set-up, completely isolated from its surroundings. However, in order to protect the patient from any possible infection during the siphonage portion of the tidal drainage cycle, if a blood-clot is siphoned through catheter 11 and tubing 13 having dimensions such that its passage through catheter 11 and tubing 13 is prevented, the irrigation set-up of FIGURE 2 must be disengaged, usually at the point where T-shaped tubing 21 is connected to tubing 13, so that a hand pump 115 such as shown in FIGURE 3 may be connected to tubing 13 for the removal of the blood-clot so that the irrigation operation may be resumed. The irrigation apparatus will result in leakage of the fluid contained in the tubing causing the bed clothes and bedding of the patient to become flooded and also creating the possibility of foreign matter being introduced into the irrigation set-up at the point where T-shaped tube 21 and tubing 13 were severed, in order to engage the hand pump (not shown) to tubing 13 for removal of the obstructions. Also, this apparatus is not completely sterile. The bottle of sterile solution is open at the top and the fluid is therefore in contact with its surroundings.

FIGURE 3 shows the irrigation apparatus 100 of my invention which consists of a closed container 101 housing a sterile fluid solution 102. Container 101 is connected to the inlet 104 of tubular apparatus, shown generally as 105, by flexible tubing 103. The other opening 104a the purpose of which will be more fully described, is sealed by plug or stopper means 104b. A flexible hand pump 115 is mounted to engage opening 114 of tubular apparatus 105. Tubing 111 engages opening 109a of L-shaped connecting tube 109 serving to connect tubular apparatus 105 to waste container 118. Clamp 116 engaging tubing 103, and clamp 116' engaging tubing 111 serve as secondary fluid control valves, as will be more fully described. Tubular apparatus 105 consists of T-shaped tube member 112, tubes 107 and 108 and connecting member 109. Tubes 107 and 108 are fused to one another at point 108 to form a single tubular configuration which is jointed to any suitable catheter, such as catheter 110. An adhesive material, such as glue for example, is placed between the sides of tubes 107 and 108 to secure the tubes to one another. The primary electromechanical control means 119 is provided for controlling the flooding and drainage, 119 consists of a housing 120, which houses the electronic circuitry (not shown) for operating the control mechanism. An indicator lamp 121 is provided on the side wall of housing 120 for apprising the operator of the energization state of the control means 119. A toggle switch 125 is provided immediately below indicating lamp 121 for turning control means 119 on or off respectively. Also mounted on the side wall of housing 120 is a reciprocating member 124, which is vertically movable between an upper or first and a lower or second position for controlling fluid flow of the irrigation set-up, as will be more fully described. The reciprocating member, which is shown in FIGURE 3, as a cylindrical rod, but may take any other shape, is positioned through an opening 150 between a parallel line flexible to 107 and 108. Stationary members 123 and 122 are positioned directly above and below, respectively the reciprocating member 124 for the purpose of alternately opening and closing flexible tubes 107 and 108, in a manner to be more fully described.

Two different indicating apparatuses, 200 and 300, are shown in FIGURE 3, positioned immediately adjacent the extremity of L tube 116. The first indicating assembly 200 is employed for the purpose of discriminating between substantially clear fluid discharges and blood discharges passing from the bladder being drained through the irrigation set-up 100 to the waste container 20. The discharge-discriminating device 200, which operates in a manner to be more fully described in connection with FIGURE 5 of the drawings, actuates an alarm means upon the occurrence of a bloody discharge, so as to apprise the hospital staff of this condition, so that it may be quickly remedied. Also, it can be appreciated that the automatic monitoring operation of this discriminating device alleviates the need for the presence of a member of the hospital staff during initiation of the drainage operation, in order to observe the color of the fluid discharge.

The fluid control alarm device 300 positioned above waste container 20, which will be described in greater detail with reference to FIGURE 6 of the drawings, is employed for the purpose of recognizing a clotting condition which may occur upon initiation of the drainage portion of the irrigation cycle. For example, when the reciprocating member 124 is moved vertically upward so that tubular member 107 is open and tubular member 108 is open, the fluid present in the bladder being irrigated will begin to drain, passing fluid through tubular members 108 and 111 into waste container 20. If, however, a clot is present at some point before the position of fluid control lever assembly 300, no fluid will pass through assembly 300 into the waste container 20. Since this fluid places a severe strain upon the bladder containing the sterile fluid, it is necessary that some indicating means be provided so that this condition may be manually corrected as soon as possible. This is done by providing a circuit (to be more fully described with reference to FIGURE 6), which actuates an alarm under such conditions and which fails to actuate the alarm when fluid flows past the fluid controlled lever mechanism, causing the alarm circuit to be in an opened or deenergized position.

FIGURES 4c and 4d are partial views of the irrigation set-up of FIGURE 3, showing the reciprocating member 124 in the first and second positions respectively. The mechanical operation of the irrigation set-up shown in FIGURES 3, 4c, and 4d is as follows:

Sterile solution 102 contained in sterile bottle 101 is passed downward through input tube 103 into the opening 104 of the tubular apparatus shown generally as 105. The fluid passes from inlet 104 of rigid tube member 112 to outlet 106 of the shaped tube 112 and then through flexible tube 107. The reciprocating member 124 during this operation is in its first position, which is shown in FIGURE 4c, so that the sterile fluid 101 passes through flexible tube 107 unimpeded as shown by arrows 151 and 151a. The fluid 102 leaves flexible tube 107, enters fused tubing portion 108 to catheter 110, which is properly inserted into the bladder of the patient (see FIGURES 1b and 2). The sterile fluid is prevented from passing from the urinary bladder into outlet tube 111 by reciprocating member 124 which, in the position shown in FIGURE 4c, clamps flexible tube 108 between reciprocating member 124 and lower stationary member 122 causing the sterile fluid which desires to leave the bladder (not shown) to be prevented from doing so, as shown by arrow 152 in FIGURE 4c, to prevent any fluid from passing to waste container 118 shown in FIGURE 30.

FIGURES 4a and 4b show the electronic circuitry employed for the operation of reciprocating member 124. The electronic circuitry is comprised of toggle switch 125 which is movable between an engaged and a disengaged position, as shown by arrow 125a, for the purpose of energizing or deenergizing the circuit respectively. Neon light 21, shown also in FIGURE 3, is in series with toggle switch 25 and has one of its terminals connected to node 140. A primary drive or motor means 130 is connected between the opposite ends of toggle switch 125 and node 148. The current loop is completed between nodes 140 and 148 by power source 131. A microswitch, shown schematically and labeled 132, is connected in series with solenoid coil 128, which elements are connected in parallel with energy source 131 at terminals 140 and 140a.

Coil 128 controls armature 127 which is physically linked to reciprocating member 124 by rod 126. The opposite side of reciprocating member 124 is physically linked to one side of biasing member 129, the opposite end of which is secured to a stationary reference point 20a (see FIGURE 3) which the physically secured to housing 120 (not shown) in any well-known manner. The spring constant "k" of the bias member 129 is sufficiently large so as to urge reciprocating member 124 in the vertically upward position as shown by arrow 160, causing reciprocating member 124 to be urged into the position shown in FIGURE 4d, which is the first or deenergized position of member 124.

Prime mover 130 has an output shaft shown schematically at 130a, which is mechanically linked with microswitch 132, in a manner to be more fully described.

The operation of the control circuit shown in FIGURE 4a is as follows: upon movement of toggle switch 125 to the engaged position a current path is completed through lamp 121, toggle switch 125, prime mover 130, and energy source 131 causing lamp 121 to glow, thereby apprising the operator that the control unit is now in the "on" state.

Simultaneously therewith prime mover 130, having been energized, causes shaft 130a to rotate as shown by arrow 130c, causing rotating shaft 130a to intermittently open and close microswitch 132, in a manner to be more fully described.

The closure of microswitch 132 establishes a current path from energy sources 131 through winding 128 and microswitch 132, which is in the engaged position, to the opposite terminal 140 of energy source 131. The energization of coil 182 urges armature 127 to move vertically downward, as shown by arrow 161. Reciprocating member 124, which is physically linked to armature 27 by extension rod 126, is likewise urged vertically downward, causing reciprocating member 124 to assume the second position, as shown in FIGURE 4c. It should be understood that coil 128 when energized exerts a magnetic force upon armature 127, which is of sufficient strength to overcome the spring constant $k$ of biasing member 129, in order to enable reciprocating member 124 to be moved vertically downward to the position shown in FIGURE 4c.

FIGURE 4b shows the mechanical cooperation between microswitch 132 and prime mover 130. The physical arrangement is such that shaft 130a is secured at one end to the armature (not shown) of prime mover 130, while the opposite end 130b of shaft 130a is secured to a rotatable disc member 137, which is arranged to rotate concurrently with the rotation of shaft 130a.

Microswitch 132 shown in FIGURE 4b is comprised of a depressable button 134, which controls a pair of internal cooperating contacts (not shown) contained within the housing of microswitch 132.

A resilient member 133 forms a cantilevered suspension with the housing 132 at point 132a. The normal position for resilient member 133 is as shown in FIGURE 4b, which is caused by depressable button 134 which abuts resilient member 133. A bias member (not shown) urges depressable button 134 upwards against resilient member 133 in the manner shown in FIGURE 4b. In this position a pair of internal contacts (not shown) within the housing 132 is moved to a disengaged position such as that position shown in FIGURE 4a of the instant application. A pair of flanges 135 are provided at the left-hand end of resilient member 133 for pivotally mounting a roller member 136.

The operation of the timing means shown in FIGURE 4b is as follows:

The disc 137, which is driven into rotation in the direction shown by arrow 130c under control of the shaft 130a, causes the heads of screw members 138 to make intermittent sliding contact with roller 136, causing the roller 136 to be driven in the vertically downward direction, as shown by arrow 162. The downward vertical movement of the roller 136 causes a resilient member 133 to be moved downward, thus depressing button 134. The depression of button 134 causes the microswitch internal contacts (not shown) to become engaged, thus establishing a current path through the microswitch contacts 132 to relay coil 128 and the energy source 131, as was previously described. It causes the energization of coil 128 and the concurrent vertically downward movement of reciprocating member 124, as set forth fully above.

As disc 137 continues to move in the clockwise direction, the screw 138 which was previously slidably engaged with roller 136 becomes disengaged causing roller 136, resilient member 133 and depressable button 134 to move to their normal positions as shown in FIGURE 4b, continuously causing the microswitch internal contacts to their normal disengaged positions.

The prime mover 130, which is employed in the preferred embodiment, may have an angular velocity of one revolution per hour; for example, under these conditions the embodiment of FIGURE 4b which shows the screw members 138 being in quadrature with each other will thereby cause solenoid 128 to become energized every quarter hour. The length of the energization period of solenoid 128 is controlled in two manners; namely, by adjusting the depth of the screw 138 with respect to its associated tapped aperture 137a and secondarily by employing a screw member having heads of either smaller or larger diameter than that shown in FIGURE 4b, for the purpose of either shortening or lengthening respectively the energization period of the coil 128, shown in FIGURE 4a. It should be understood that the preferred embodiment described herein is in no way limited to a quarter hour cycle, such as that shown in FIGURE 4b, but any other cycle may be employed depending strictly upon the needs of the user. Additional apertures 137a are provided around the periphery of rotatable disc 137 for the purpose of additional screw members 138, and it should be understood that the screw members 138 may be positioned around the periphery of disc 137 in an irregular fashion to provide an irregular energization pattern for the coil 28 or screw members 138 may be arranged around the periphery of disc 137 in a regular fashion, other than that shown in FIGURE 4b. Likewise, the prime mover 130, which is employed, may have a revolution per hour value which is greater or smaller than one revolution per hour, in order to provide another means for controlling the energization period of coil 128.

FIGURE 9 shows two disc arrangements 400a and 400b respectively which may be used in place of the disc 137 shown in FIGURE 4b of the drawings. It should therefore be noted that the circular configuration is not the significant element here but that the only significant factor is the need to provide means equivalent to the screw means 138 of FIGURE 4b to come into engagement with the wheel 136 of the microswitch 132. This is performed effectively by the projection 401a or 401b of the members 400a or 400b respectively.

The detailed circuitry of the fluid discharge-discriminating device 200, which is shown in FIGURE 5, is comprised of a casing 201, having upper and lower tubular extensions 202 and 203 respectively. Tubular openings 202 and 203 respectively cooperate with flexible tubing 111 to form a closed path, thereby coupling the discharge through the irrigation apparatus to the waste container (not shown), thereby maintaining a closed system throughout. The main casing 201 is a substantially toroidal-shaped housing, which has positioned therein at diametrically opposed locations of a source of light 205 and a photo electric cell 207 respectively. The light means 205 is connected to an energy source 206, so as to provide adequate light ray energy, which passes through an aperture 202 so as to impinge upon the cathode 207a of photo electric tube 207. The photo electric tube 207 is connected in a serial arrangement with energy source 208 and relay means 209. A cooperating circuit which consists of normally closed contacts 209a, energy source 210 and alarm means 211 cooperates with and is controlled by relay solenoid 209.

As can be noted, the upper tubular projection 202 of fluid discharge discriminating assembly 200 extends downwardly and has a lower portion 204, which is tapered inwardly, and the lower end of which is adjacent the aperture or slit 220, through which light rays 225 pass.

The operation of the fluid discharge discriminating means is as follows:

During the drainage portion of the irrigation cycle, the sterile fluid being drained from the bladder passes through the irrigation apparatus and eventually passes through tubing 111 in the direction shown by arrow 230. The fluid subsequently passes through the region of the opening or slit 220, thereby attenuating the intensity of the light rays 225, passing through light source 205 to photoelectric tube 207. It should be noted that prior to the passage of any fluid through the region bounded by slit 220, the maximum amount of light ray intensity exists at this time. This magnitude is sufficient to produce current flow in the circuit, which includes photo-electric tube 207, causing relay solenoid 209 to be energized. In this condition relay solenoid 209 maintains normally closed contacts 209a in the opened position, thereby making the current path of alarm circuit 211 and energy source 210 incomplete or open.

Upon the occurrence of a bloody discharge when the fluid passes in region of slit 220, the light intensity at this time is substantially attenuated, thereby cutting off the current flow in the circuit containing photo-electric tube 207, thereby deenergizing relay solenoid 209. This causes the normally closed contact pair 209a to move to its normally closed condition, thereby completing the circuit which includes the alarm means 211. In this manner the hospital staff is immediately apprised of a condition wherein a bloody discharge from the patient's bladder is occurring, and may take immediate steps to correct this situation.

The tapered portion 204 of the upper tubular projection 202 causes the fluid 231 passing through this region to be deflected toward the center of the structure, as shown by phantom line 232, thereby acting as an umbrella to shield the light source 205 and photo cell 207 from the fluid passing through. This structure provides a path between light source 205 and photo-electric cell 207, which is unimpeded except for the fluid passing therethrough.

An alternative embodiment which was considered is that of providing a perferctly transparent wall between photocell 207 and light source 205, but this has the disadvantage of becoming coated with dried blood, so that even during periods when clear sterile fluid is being drained thereinto the light rays passing from light source 205 to photo-electric cell 207 will be attenuated subsequently, causing alarm 207 to be actuated which thereby incorrectly apprises the hospital staff of the patient's condition. This is completely avoided by providing no wall whatsoever between light source 205 and photo-electric cell 207 and by shielding or protecting these tube members from fluid passing through the fluid discharge discriminating device 200 by means of the tapered wall 204. It should be noted that the alarm 211 may be mounted in the vicinity of the patient, such as within the room in which the patient is located, or may be employed at some remote location, such as the central disc of the floor or wall in which the patient is located, and that a central console may be provided whereby all such irrigation set-ups throughout that bound floor or wall may be observed at one location, thereby substantially decreasing the amount of personnel necessary to monitor all such irrigation operations.

The fluid controlled lever indicating assembly 300 is shown in FIGURE 6, and is comprised of a tubular portion 301, which is engaged at its upper end with flexible tubing 111 and at its lower end with waste container 20, a portion of which is shown in FIGURE 6. A lever 302 is provided which is positioned within the tubular member 301, and is pivoted at pivot point 303. Adjacent to lever 302 a microswitch 310 is positoned along tubular member 310 so as to be mounted immediately adjacent lever 302. The upper arm 302b of lever 302 is positioned to cooperate with a button 310a of micro-switch 310, which is connected in a series circuit consisting of the normally opened contact pair (not shown) of microswitch 310, energy source 306, normally closed contact pair 128, and alarm means 308.

The fluid controlled lever arm 302 has a torsion spring 304 secured thereto, which is mounted so as to cause lever arm 302 to be urged in the clockwise direction about pivot point 303, as shown by arrow 316 of FIGURE 6. In this position upper portion 302b of lever arm 302 bears upon microswitch button 310a, causing the contacts contained therein to move to the closed position. Upon the passage of the sterile fluid through tube 111, in the direction shown by arrow 320 in FIGURE 6, the fluid passing thereinto impinges upon the upper surface of portion 302a of lever arm 302, causing the arm to be pivoted counterclockwise about pivot point 303, as shown by arrow 315. This causes upper portion 302b of lever arm 302 to move away from microswitch button 310a causing the contacts (not shown) contained within the body of microswitch 310 to move to the opened or disengaged position.

The operation of the fluid controlled lever assembly is as follows:

Upon initiation of the drainage portion of the irrigation cycle, the fluid flows through the irrigation set-up as shown in FIGURE 2, and subsequently passes through tubular member 111 until it reaches the region of fluid controlled lever member 302. In this condition the torsion spring 304 is positioned so that the fluid passing down and through tubular member 301 is sufficient to drive lever arm 302 counterclockwise about its pivot point 303 as shown by arrow 315. In this condition the series circuit comprised of energy source 306, normally closed contacts 128a, alarm means 308, and the contacts (not shown) of microswitch 310 is in a deenergized state due to the opening of the microswitch contacts which have opened upon movement of upper portion 302b of lever arm 302 away from microswitch button 310a. Thus, no alarm signal is generated by alarm means 308, which is as it should be since this is the normal situation.

If, however, upon initiation of the drainage portion of the irrigation cycle a clot appears either within the body of the patient or along some point of the irrigation apparatus before the location of tubular member 301, then no fluid flows through tubular portion 301. Under these circumstances, since no fluid passes through tubular member 301, the lever arm 302 is pivoted clockwise about its pivot point 303, as shown by arrow 316 of FIGURE 6, causing upper portion 302b of fluid controlled lever arm 302 to bear upon microswitch 310, energy source 306, normally closed contacts 128 and alarm 308, causing an alarm signal to be generated.

The normally closed contact pair 128a is under control of relay solenoid 128 shown in FIGURE 4a of the drawings, and operates as follows: Upon energization of relay solenoid 128, which initiates the flooding portion of the irrigation cycle, normally opened contacts 128a are operated to the closed position. Upon initiation of the drainage portion of the irrigation cycle, relay solenoid 128 is deenergized, causing relay contact pair 128a to return to its normally open position. However, contact pair 128a has a slow-to-open arrangement (not shown), so that the contact pair 128a returns to its normally opened position after a predetermined time period has elapsed. This time period is adjusted so that its duration is greater than the time required for the fluid to drain from the bladder being irrigated to the waste container 20. This provides a unique alarm arrangement, which is energized only within a predetermined time period after initiation of the drainage portion of the irrigation cycle. This can be appreciated by the following example:

The time duration between the termination of a flooding phase of the irrigation cycle and the initiation of the next flooding phase of the irrigation cycle may be as long as fifteen minutes. However, only a brief period of this time, say fifty seconds, is necessary for the sterile flood to drain from the bladder to the waste container 20, which takes place during the time period from the termination of a flooding portion of the cycle to a time fifty seconds beyond this time. During the remaining fourteen minutes and ten seconds which will elapse before the initiation of the next flooding portion of the irrigation cycle, substantially no fluid will pass to the waste container 20, thereby placing the upper portion 302b of lever arm 302 in contact with microswitch button 310a, causing the contact pair (not shown) contained therein to be in the closed position. If, however, the contact pair 128a were not provided in the series circuit, an erroneous alarm woulld be generated in this series circuit, which would apprise the hospital staff of a clotting condition which does not really exist. Thus, the slow-to-open contact pair 128a provides the necessary function of discriminating between a clot which occurs at the inception of a drainage portion of an irrigation operation, while at the same time preventing any erroneous alarm signal from being generated subsequent to the completion of the drainage portion of the irrigation operation.

Returning now to FIGURES 3, 4c, and 4d the complete cycle of operation is as follows:

With the reciprocating member 124 in the position shown in FIGURE 4c the sterile solution 102 enters the urinary bladder (see FIGURE 1a) unimpeded due to the position of reciprocating member 124. At this instant, however, tube 108 is pinched or clamped to prevent any flow of fluid from the bladder through tube 108 to waste container 118.

Upon closure of the microswitch 132 shown in FIGURES 3a and 4b reciprocating member moves from the position shown in FIGURE 4c to that shown in FIGURE 4c impeding the flow of sterile solution 102 from reservoir 101 due to the pinching of flexible member 107 between reciprocating member 124 and stationary member 123. At this time, however, drainage takes place due to the unobstructed condition of flexible tube 108 permitting the solution to flow through tube 108 into waste container 118.

If during the siphonage portion of the irrigation cycle, a blood-clot obstructs the flow of the solution 102 from waste container 118, the blood-clot may be removed as follows: secondary clamps 116 and 116' are adjusted to prevent the flow of solution 102 from container 101 to apparatus 105 and from catheter 110 to waste container 118 respectively. The operator (not shown) then places his hand 117 around tubes 107 and 108, and tubes 107 and 108 are then squeezed together and reelased in a vigorous cyclical fashion. This creates a sucking action which withdraws the blood-clot.

If this pumping action of tubes 107 and 108 fails to remove the blood-clot, the hand-pump or bulb 115 may be squeezed together and released vigorously in the same manner as tubes 107 and 108, retaining clamps 116 and 116' in their closed position. Hand-pump 115 inherently has a greater suction potential than the hand squeezing operation of tubes 107 and 108. The squeezing and releasing of tubes 107 and 108 should be resorted to initially, however, since the sucking action which is created places a stress upon the urinary bladder of the patient making the patient quite uncomfortable. For this reason, it can be seen that the hand-pump 115 should be resorted to only if the pumping action of the tubes 107 and 108 fails to remove the blood-clot.

Referring now to FIGURES 7, 8a and 8b, the electromechanical controlled means 119 is positioned in a housing 500 which is adapted to be secured to any well known support means. The stationary members 123 and 122 are positioned along the wall 501 of housing 500 with the valve control means 124 in the same manner as is shown in FIGURES 3, 4c and 4d. The on-off toggle switch member shown schematically as number 125a in FIGURE 4a is positioned along side wall 502 together with lamp member 121.

A manual control knob 503 is mounted along side wall 501 and is provided for slidably positioning microswitch member 132 in order to select the desired flooding cycle in a manner to be more fully described. A second manually operable control knob 504 is provided along side wall 502 for the purpose of initiating a flooding operation at times other than the regular flooding phases of the irrigation cycles as will be more fully described.

FIGURES 8a and 8b show the microswitch means 132 which is slidably mounted for reciprocal movement in the direction shown by arrows 505 and 506. The sliding arrangement is provided by the assembly consisting of the clamp members 507 and 508 secured to the opposite ends of microswitch 132 in any well known manner. Two rods 509 and 510 are secured at a first end (not shown) to the housing side wall 501 and are inserted through the apertures 511 and 512 which are formed by the clamps 507 and 508 and the adjacent walls of microswitch 132. A third rod 513 is secured to the wall 514 of microswitch 132 at one end and has its opposite end projecting through an aperture 515 in side wall 501 so as to be rigidly secured by a knob 516 in any well known manner.

Thus, in order to move the microswitch assembly 132 in the direction shown by arrow 505 one need only pull knob 516 in the same direction and conversely to move microswitch assembly 132 in the direction of the arrows shown by 506 and knob 516 is pushed in the opposite direction.

A keying arrangement 520 is provided so as to position the switch assembly 132 in a plurality of discrete longitudinal positions for a reason to be more fully described. The keying assembly consists of a first flat member 521 which is secured to an inner wall 522 of housing 500 by fastening means 523. First and second spring members 524 and 525 have their first ends secured to flat plate 521 and their opposite ends to keying member 526. Spring members 524 and 525 are adapted to urge keying member 526 in the upward vertical direction. Keying means for grooves 527 are provided along the upper surface of keying member 526 which grooves are adapted to seat a projection 52 of complementary configuration which is provided along the lower surface of switch means 132.

Thus, as switch means 132 is moved from the position shown in FIGURE 8a in the direction shown by arrow 505 projection 528 will engage the projection 526'. In this position the operator will be apprised of the fact that switch assembly 132 is now seated in one of the discrete longitudinal positions.

Positioned immediately above the slidable switch assembly 132 is the rotary drive means which consists of shaft 130a which shaft has a plurality of disc members 137, 137' and 137" secured thereto and rotatable therewith. Each disc member is arranged so as to generate a flooding cycle which is different from the remaining disc members secured to the common shaft 130a. For example, the disc member 137 may provide a flooding operation every 15 minutes, disc 137' may provide a flooding operation every 30 minutes and disc 137" may provide a flooding operation every 60 minutes.

In order to select the desired flooding period the control knob 516 is pulled away from the side wall 501 in the direction shown by arrow 505 enabling the projection 528 of switch assembly 132 to be seated in one of the grooves 527. It should be noted that each groove is associated with one of the disc members mounted to common drive shaft 130a.

In order to apprise the operator of the position which the switch assembly 132 occupies the rod 513 is coated in the areas 513a, 513b and 513c so that upon the emergence of the colored area through the aperture 515 the operator is apprised that the microswitch assembly 132 occupies a different position. A ledge 530 is provided on the side wall 501 immediately above control knob 503 relating the colors painted on rod 513 to the flooding cycles. It should be noted that the operator is further apprised of the proper seating of switch assembly 132 by the springing into position experienced by the projection 528 and cooperating groove 527 due to the spring mounting of the keying member 526.

As was previously described when a severe bleeding or clotting condition occurs the alarm signals immediately apprise the authorities of these conditions so that remedial steps may be promptly taken. These remedial steps usually consist of a further cleansing of the bladder being treated. In order to permit the initiation of an immediate flooding action without waiting until the disc member 137 closes the microswitch 132. A mechanical initiating means is provided. The mechanical initiating means 540 consists of a control handle 504 having a first end projecting through a substantially L-shaped slot 541 in housing side wall 502. An intermediate point 504' of rod 504 is pivotally mounted to side wall 550 which is parallel to side wall 502 of housing 500. The opposite end 505" of rod 504 is physically secured to member 135 of microswitch 132 causing pivotally mounted rod 504 to be normally maintained in the position shown in FIGURE 8b.

The operation of the manually operated flooding initiating means 540 is as follows:

Assuming that either a clotting or bleeding condition has occurred, the means shown in FIGURES 6 and 5, respectively, which generate the appropriate alarm, apprise the authorities of this condition. A portion of the means employed to correct such a bleeding or clotting condition consists of a further flooding action of the bladder being treated. However, since the existence of the bleeding or clotting conditions may, and most normally do, occur during the drainage portion of the irrigation cycle it is necessary to provide means for immediately initiating a bladder flooding cycle.

This is done by moving the manually operable handle 504 in the direction shown by arrow 551 in FIGURE 7 to the upper portion of slot 541. This causes rod 504 to pivot clockwise about its pivot point 504' in the direction shown by arrow 552 (see FIGURE 8b). This causes the microswitch member 135 to move in the downward vertical direction in the same manner that it would under the control of the cam means 137 thereby immediately initiating a flooding operation. In order to provide a manually initiated flooding operation for a predetermined time period the operating handle 504 after being moved upward in the direction shown by arrow 551 is moved slightly to the right as shown by arrow 552 in FIGURE 7 so that the lower edge of rod 504 engages the arcuate portion 541' of slot 541. The rod will be retained in this position until it is moved to the left as shown by arrow 554 in FIGURE 7 which due to the biasing force of member 135 causes the rod 504 to return to its normal position as shown in FIGURE 7. Thus the flooding operation may be controlled by positioning the rod 504 in the aforementioned manner without the necessity for holding the rod in the initiating position.

In order to secure flexible tubes 107 and 108 between stationary members 122 and 123 a securing means is provided as shown in FIGURE 10 which consists of a rotatably mounted member 560 having a centrally located aperture 561 through which valve control member 124 is inserted. A spring means 562 is positioned between the flattened head 124a of member 124 and member 560 and is adapted to urge member 560 towards stationary members 122 and 123. Stationary members 122 and 123 are provided with vertically aligned grooves 564 and 565 respectively for seating the extending arms of member 560. Thus, in the position shown in FIGURE 10 the biasing means 562 retains member 560 seated in the associated grooves 564 and 565 thereby preventing the flexible tube contained therein from being removed from their normal operating positions. In order however, to remove the flexible tube therefrom, member 560 is lifted against the force of spring member 562 slightly away from the stationary members so that it may be rotated in either clockwise or counter-clockwise directions relative to its pivot means 124 permitting the tube to be removed therefrom.

An alternative embodiment for so securing the flexible tubing between the stationary members is shown in FIGURE 11 and consists of first and second elongated members 571 and 572 which are pivotally mounted at pivot points 573 and 574 respectively of stationary member 123. In the position shown in FIGURE 10 these elongated members are positioned flush in associated grooves of stationary member 123 to permit insertion and/or removal of the flexible tubing. When the elongated members 571 and 572 are pivoted counter-clockwise and clockwise respectively as shown by arrows 575 and 576 respectively these members are engaged by associated grooves 577 and 578 in lower stationary member 122 in the manner shown by the dotted configurations 571′ and 572′ for the purpose of securing the flexible tubing between stationary members 122 and 123 and the side wall 501 of the housing 500.

It can be seen from the following description that none of the components of irrigation apparatus 100 need be removed or disengaged at any time during the irrigation operation, even during the existence of a blood-clot which obstructs and hence prevents the irrigation operations. This permits the irrigation set-up which initially is a sterile set-up to remain sterile throughout the entire operation.

Another alternative embodiment for controlling time apparatus for irrigation is shown in FIGURE 12. Elements of FIGURE 12 identical to elements shown in FIGURES 4a and 4b are designated with like numerals.

The time selection circuit shown in FIGURE 12 is comprised of a motor means 130 having a shaft 130a upon which cam means 137, 137′ and 137″ are secured. As previously recited this arrangement is identical to that shown in FIGURES 8a and 8b. Each cam means is associated with a microswitch shown in FIGURE 12 schematically and designated at 132, 132′ and 132″ respectively. A time selection switch 601 has a first terminal connected by means of conductor 600 to one terminal of the energy source 131. Switch 601 is provided with a rotatable arm 602 movable about a pivoted point 606. Arm 602 cooperates with circularly arrayed conductive segments 603, 604 and 605 which are connected by means of conductors to one terminal of an associated microswitch 132, 132′ and 132″ respectively. Switch 601 is provided with a manually operable control knob (not shown) which is mechanically linked by means not shown to the rotary arm 602 so as to rotate 602 in either the clockwise or counter-clockwise direction as shown by arrows 607. With the rotary arm 602 in the position shown in FIGURE 12 the microswitch 132 associated with the cam 137 is connected in the time selection circuit while the microswitches 132′ and 132″ are disconnected from the circuit. The remaining microswitches may be connected without energizing means 131 in the same manner as the microswitch 132, so as to permit selection of another irrigation timing cycle as desired by the user.

In order to provide for manual operation of the irrigation function due to an emergency situation a manual switch shown schematically and designated by numeral 504 is provided which is connected so as to electrically shunt the microswitch branches in order to energize the solenoid 128 to provide an immediate irrigation operation.

As shown in FIGURE 5, a screen 136 is placed at the extremity of tubular member 112 which screen serves to prevent the entrance of obstructions such as blood-clots or mucus into the hand-pump 115 shown in FIGURE 5 in dotted fashion.

A flexible tube (not shown) may be used to connect a manometer such as manometer 24 shown in FIGURE 2 in order to measure intracystic procedure of the urinary bladder. This is done by removing plug for stopper 104b and placing the connecting tube between the irrigation set-up at opening 104c and the manometer such as that shown in FIGURE 2.

Normally, the sucking action which is created by the squeezing and releasing of flexible tubes 107 and 108 is adequate to remove the blood-clot. Under these circumstances, no element of the system need be opened in order to remove the blood-clot.

It can be seen from the foregoing that I have provided an irrigation apparatus which is fully automatic, light in weight, simple to use and which retains a sterile condition throughout the entire irrigation operation.

Although I have described my invention in connection with the preferred embodiments thereof, I prefer to be bound not by the disclosure and drawings, but only by the appending claims.

The embodiments of the invention in which an exclusive privilege or property is claimed are defined as follows:

1. Apparatus for irrigating the bladder of a patient comprising first flexible means for supplying sterile fluid, second means connected to said first means for transferring said fluid to said bladder, third flexible means for withdrawing said sterile fluid from said bladder, said first and third flexible means adapted to cooperate with one another to form a manually operable means for removing constrictions occurring in said apparatus, automatic means operatively connected to said irrigation apparatus for controlling the insertion and withdrawal of fluid in said first and third flexible means, said first and third means each having inner diameters greater than said second means, said automatic means having first and second stationary walls, said first and third means positioned between said walls, a reciprocating member positioned between said first and third members and intermediate said walls, said reciprocating member being movable between a first and second position; said first member being clamped between said reciprocating member and said first wall when said reciprocating member is in said first position; said second member being clamped between said reciprocating member and said second wall when said reciprocating member is in said second position, electronic control means for moving said reciprocating member between said first and said second positions, said control means including adjustable means for generating a signal to control the time period during which said reciprocating member is in said second position.

2. Apparatus for irrigating the bladder of a patient comprising first flexible means for supplying sterile fluid, second means connected to said first means for transferring said fluid to said bladder, third flexible means for withdrawing said sterile fluid from said bladder, said first and third flexible means adapted to cooperate with one another, to form a manually operable means for removing constrictions occurring in said apparatus, automatic means operatively connected to said irrigation apparatus for controlling the insertion and withdrawal of fluid in said first and third flexible means, said first and third means each having inner diameters greater than said second means, said automatic means having first and second stationary walls, said first and third means positioned between said walls, a reciprocating member positioned between said first and third members and intermediate said walls, said reciprocating member being movable between a first and second position; said first member being clamped between said reciprocating member and said first wall when said reciprocating member is in said first position; said second member being clamped between said reciprocating member and said second wall when said reciprocating member is in said second position, electronic control means for moving said reciprocating member between said first and said second positions, said control means including adjustable means for generating a signal to control the time period during which said reciprocating member is in said second position; means for biasing said reciprocating member in said first position; said control means including means under control of said adjustable means output signal for overcoming said biasing means to move said reciprocating member to said second position.

3. Apparatus for irrigating the bladder of a patient comprising first flexible means for supplying sterile fluid, second means connected to said first means for transferring said fluid to said bladder, third flexible means for withdrawing said sterile fluid from said bladder, said first and third flexible means adapted to cooperate with one another to form a manually operable means for removing constrictions occurring in said apparatus, automatic means operatively connected to said irrigation apparatus for controlling the insertion and withdrawal of fluid in said first and third flexible means, said first and third means each having inner diameters greater than said second means, said automatic means having first and second stationary walls, said first and third means positioned between said walls, a reciprocating member positioned between said first and third members and intermediate said walls, said reciprocating member being movable between a first and second position; said first member being clamped between said reciprocating member and said first wall when said reciprocating member is in said first position; said second member being clamped between said reciprocating member and said second wall when said reciprocating member is in said second position, electronic control means for moving said reciprocating member between said first and said second positions, said control means including adjustable means for generating a signal to control the time period during which said reciprocating member is in said second position; means for biasing said reciprocating member in said first position; said control means including means under control of said adjustable means output signal for overcoming said biasing means to move said reciprocating member to said second position, said control means including a solenoid having an armature linked to said reciprocating member.

4. Apparatus for irrigating the bladder of a patient comprising first flexible means for supplying sterile fluid, second means connected to said first means for transferring said fluid to said bladder, third flexible means for withdrawing said sterile fluid from said bladder, said first and third flexible means adapted to cooperate with one another to form a manually operable means for removing constrictions occurring in said apparatus, automatic means operatively connected to said irrigation apparatus for controlling the insertion and withdrawal of fluid in said first and third flexible means, said first and third means each having inner diameters greater than said second means, said automatic means having first and second stationary walls, said first and third means positioned between said walls, a reciprocating member positioned between said first and third members and intermediate said walls, said reciprocating member being movable between a first and second position; said first member being clamped between said reciprocating member and said first wall when said reciprocating member is in said first position; said second member being clamped between said reciprocating member and said second wall when said reciprocating member is in said second position, electronic control means for moving said reciprocating member between said first and said second positions, said control means including adjustable means for generating a signal to control the time period during which said reciprocating member is in said second position; means for biasing said reciprocating member in said first position; said control means including means under control of said adjustable means output signal for overcoming said biasing means to move said reciprocating member to said second position, said adjustable means comprising a source of energy, switch means connected between said energy source to said control means; timing means for operating said switch means between an open and a closed position for controlling the connection of said energy source to said control means.

5. Apparatus for irrigating the bladder of a patient comprising first flexible means for supplying sterile fluid, second means connected to said first means for transferring said fluid to said bladder, third flexible means for withdrawing said sterile fluid from said bladder, said first and third flexible means adapted to cooperate with one another to form a manually operable means for removing constrictions occurring in said apparatus, automatic means operatively connected to said irrigation apparatus for controlling the insertion and withdrawal of fluid in said first and third flexible means, said first and third means each having inner diameters greater than said second means, said automatic means having first and second stationary walls, said first and third means positioned between said walls, a reciprocating member positioned between said first and third members and intermediate said walls, said reciprocating member being movable between a first and second position; said first member being clamped between said reciprocating member and said first wall when said reciprocating member is in said first position; said second member being clamped between said reciprocating member and said second wall when said reciprocating member is in said second position, electronic control means for moving said reciprocating member between said first and said second positions, said control means including adjustable means for generating a signal to control the time period during which said reciprocating member is in said second position; means for biasing said reciprocating member in said first position; said control means including means under control of said adjustable means output signal for overcoming said biasing means to move said reciprocating member to said second position, said adjustable means comprising a source of energy, switch means connected between said energy source to said control means; timing means for operating said switch means between an open and a closed position for controlling the connection of said energy source to said control means, said control means comprising a solenoid having an armature linked to said reciprocating member, said solenoid being connected to said switch means.

6. Apparatus for irrigating the bladder of a patient comprising first flexible means for supplying sterile fluid, second means connected to said first means for transferring said fluid to said bladder, third flexible means for withdrawing said sterile fluid from said bladder, said first and third flexible means adapted to cooperate with one another to form a manually operable means for removing constrictions occurring in said apparatus, automatic means operatively connected to said irrigation apparatus for controlling the insertion and withdrawal of fluid in said first and third flexible means, said first and third means each having inner diameters greater than said second means, said automatic means having first and second stationary walls, said first and third means positioned between said walls, a reciprocating member positioned between said first and third members and intermediate said walls, said reciprocating member being movable between a first and second position; said first member being clamped between said reciprocating member and said first wall when said reciprocating member is in said first position; said second member being clamped between said reciprocating member and said second wall when said reciprocating member is in said second position, electronic control means for moving said reciprocating member between said first and said second positions, said control means including adjustable means for generating a signal to control the time period during which said reciprocating member is in said second position; means for biasing said reciprocating member in said first position; said control means including means under control of said adjustable means output signal for overcoming said biasing means to move said reciprocating member to said second position, said adjustable means comprising a source of energy, switch means connected between said energy source to said control means; timing means for operating said switch means between an open and a closed position for controlling the connection of said energy source to said control means, said control means comprising a solenoid having an armature linked to said reciprocating member, said solenoid being connected to said switch means, said timing means including a motor driven by said energy source, a cam rotated by said motor, first means on the periphery of said cam being positioned to abut said switch means at least once during a complete cycle of rotation.

7. Apparatus for irrigating the bladder of a patient comprising first flexible means for supplying sterile fluid, second means connected to said first means for transferring said fluid to said bladder, third flexible means for withdrawing said sterile fluid from said bladder, said first and third flexible means adapted to cooperate with one another to form a manually operable means for removing constrictions occurring in said apparatus, automatic means operatively connected to said irrigation apparatus for controlling the insertion and withdrawal of fluid in said first and third flexible means, said first and third means each having inner diameters greater than said second means, said automatic means having first and second stationary walls, said first and third means positioned between said walls, a reciprocating member positioned between said first and third members and intermediate said walls, said reciprocating member being movable between a first and second position; said first member being clamped between said reciprocating member and said first wall when said reciprocating member is in said first position; said second member being clamped between said reciprocating member and said second wall when said reciprocating member is in said second position, electronic control means for moving said reciprocating member between said first and said second positions, said control means including adjustable means for generating a signal to control the time period during which said reciprocating member is in said second position, means for biasing said reciprocating member in said first position; said control means including means under control of said adjustable means output signal for overcoming said biasing means to move said reciprocating member to said second position, said adjustable means comprising a source of energy, switch means connected between said energy source to said control means; timing means for operating said switch means between an open and a closed position for controlling the connection of said energy source to said control means, said control means comprising a solenoid having an armature linked to said reciprocating member, said solenoid being connected to said switch means, said timing means including a motor driven by said energy source, a cam rotated by said motor, first means on the periphery of said cam being positioned to abut said switch means at least once during a complete cycle of rotation, said switch means including an arm cooperating with said first means on said cam for closing said switch means when said first means abuts said arm; said arm being normally biased to retain said switch in its open position.

8. Apparatus for irrigating the bladder of a patient comprising first flexible means for supplying sterile fluid, second means connected to said first means for transferring said fluid to said bladder, third flexible means for withdrawing said sterile fluid from said bladder, said first and third flexible means adapted to cooperate with one another to form a manually operable means for removing constrictions occurring in said apparatus, automatic means operatively connected to said irrigation apparatus for controlling the insertion and withdrawal of fluid in said first and third flexible means, said first and third means each having inner diameters greater than said second means, said automatic means having first and second stationary walls, said first and third means positioned between said walls, a reciprocating member positioned between said first and third members and intermediate said walls, said reciprocating member being movable between a first and second position; said first member being clamped between said reciprocating member and said first wall when said reciprocating member is in said first position; said second member being clamped between said reciprocating member and said second wall when said reciprocating member is in said second position, electronic control means for moving said reciprocating member between said first and said second positions, said control means including adjustable means for generating a signal to control the time period during which said reciprocating member is in said second position, means for biasing said reciprocating member in said first position; said control means including means under control of said adjustable means output signal for overcoming said biasing means to move said reciprocating member to said second position, said adjustable means comprising a source of energy, switch means connected between said energy source to said control means; timing means for operating said switch means between an open and a closed position for controlling the connection of said energy source to said control means, said control means comprising a solenoid having an armature linked to said reciprocating member, said solenoid being connected to said switch means, said timing means including a motor driven by said energy source, a cam rotated by said motor, first means on the periphery of said cam being positioned to abut said switch means at least once during a complete cycle of rotation, said switch means including an arm cooperating with said first means on said cam for closing said switch means when said first means abuts said arm; said arm being normally biased to retain said switch in its open position, said cam first means being adapted to adjust the length of time the first means abuts said switch arm and for controlling the number of times said cam abuts said switch arm in one cycle of rotation.

9. Irrigation opparatus for connecting a sterile fluid source and a waste container to a catheter comprising a first substantially straight tubular member connected to a sterile fluid source, a second substantially straight tubular member positioned adjacent to and in parallel alignment with said first tubular member, the adjacent openings of said first and second tubular members being fused to form a common passageway for receiving a catheter, the remaining opening of said second tubular member being adapted to pass said sterile fluid to a waste container, said first and second tubular members being formed of a flexible material to permit manual manipulation of said tubular members for removal of constrictions occurring in said apparatus during the irrigation operation, pressure indicating means connected to said third opening for indicating the intracystic pressure of the urinary bladder, automatic means operatively connected to said irrigation apparatus for controlling the insertion and withdrawal of fluid in said first and third flexible means, said first and third means each having inner diameters greater than said second means, said automatic means having first and second stationary walls, said first and third means positioned between said walls, a reciprocating member positioned between said first and third members and intermediate said walls, said reciprocating member being movable between a first and second position; said first member being clamped between said reciprocating member and said first wall when said reciprocating member is in said first position; said second member being clamped between said reciprocating member and said second wall when said reciprocating member is in said second position, electronic control means for moving said reciprocating member between said first and said second positions, said control means including adjustable means for generating a signal to control the time period during which said reciprocating member is in said second position.

10. Irrigation apparatus for connecting a sterile fluid source and a waste container to a catheter comprising a first substantially straight tubular member connected to a sterile fluid source, a second substantially straight tubular member positioned adjacent to and in parallel alignment with said first tubular member, the adjacent openings of said first and second tubular members being fused to form a common passageway for receiving a catheter, the remaining opening of said second tubular member being adapted to pass said sterile fluid to a waste container, said first and second tubular members being formed of a flexible material to permit manual manipulation of said tubular members for removal of constrictions occurring in said apparatus during the irrigation operation, pressure indicating means connected to said third opening for indicating the intracystic pressure of the urinary bladder, automatic means operatively connected to said irrigation apparatus for controlling the insertion and withdrawal of fluid in said first and third flexible means, said first and third means each having inner diameters greater than said second means, said automatic means having first and second stationary walls, said first and third means positioned between said walls, a reciprocating member positioned between said first and third members and an intermediate said walls, said reciprocating member being movable between a first and second position; said first member being clamped between said reciprocating member and said first wall when said reciprocating member is in said first position; said second member being clamped between said reciprocating member and second wall when said reciprocating member is in said second position, electronic control means for moving said reciprocating member between said first and said second positions, said control means including adjustable means for generating a signal to control the time period during which said reciprocating member is in said second position, means for biasing said reciprocating member in said first position; said control means including means under control of said adjustable means output signal for overcoming said biasing means to move said reciprocating member to said second position.

11. Irrigation apparatus for connecting a sterile fluid source and a waste container to a catheter comprising a first substantially straight tubular member connected to a sterile fluid source, a second substantially straight tubular member positioned adjacent to and in parallel alignment with said first tubular member, the adjacent openings of said first and second tubular members being fused to form a common passageway for receiving a catheter, the remaining opening of said second tubular member being adapted to pass said sterile fluid to a waste container, said first and second tubular members being formed of a flexible material to permit manual manipulation of said tubular members for removal of constrictions occurring in said apparatus during the irrigation operation, pressure indicating means connected to said third opening for indicating the intracystic pressure of the urinary bladder, automatic means operatively connected to said irrigation apparatus for controlling the insertion and withdrawal of fluid in said first and third flexible means, said first and third means each having inner diameters greater than said second means, said automatic means having first and second stationary walls, said first and third means positioned between said walls, a reciprocating member positioned between said first and third members and an intermediate said walls, said reciprocating member being movable between a first and second position; said first member being clamped between said reciprocating member and said first wall when said reciprocating member is in said first position; said second member being clamped between said reciprocating member and said second wall when said reciprocating member is in said second position, electronic control means for moving said reciprocating member between said first and said second positions, said control means including adjustable means for generating a signal to control the time period during which said reciprocating member is in said second position, means for biasing said reciprocating member in said first position; said control means including means under control of said adjustable means output signal for overcoming said biasing means to move said reciprocating member to said second position, said control means including a solenoid having an armature linked to said reciprocating member.

12. Irrigation apparatus for connecting a sterile fluid source and a waste container to a catheter comprising a first substantially straight tubular member connected to a sterile fluid source, a second substantially straight tubular member positioned adjacent to and in parallel alignment with said first tubular member, the adjacent openings of said first and second tubular members being fused to form a common passageway for receiving a catheter, the remaining opening of said second tubular member being adapted to pass said sterile fluid to a waste container, said first and second tubular members being formed of a flexible material to permit manual manipulation of said tubular members for removal of constrictions occurring in said apparatus during the irrigation operation, pressure indicating means connected to said third opening for indicating the intracystic pressure of the urinary bladder, automatic means operatively connected to said irrigation apparatus for controlling the insertion and withdrawal of fluid in said first and third flexible means, said first and third means each having inner diameters greater than said second means, said automatic means having first and second stationary walls, said first and third means positioned between said walls, a reciprocating member positioned between said first and third members and an intermediate said walls, said reciprocating member being movable between a first and second position; said first member being clamped between said reciprocating member and said first wall when said reciprocating member is in said first position; said second member being clamped between said reciprocating member and said second wall when said reciprocating member is in said second position, electronic control means for moving said reciprocating member between said first and said second positions, said control means including adjustable means for generating a signal to control the time period during which said reciprocating member is in said second position, means for biasing said reciprocating member in said first position; said control means including means under control of said adjustable means output signal for overcoming said biasing means to move said reciprocating member to said second position, said adjustable means comprising a source of energy, switch means connected between said energy source to said control means; timing means for operating said switch means between an open and a closed position for controlling the connection of said energy source to said control means.

13. Irrigation apparatus for connecting a sterile fluid source and a waste container to a catheter comprising a first substantially straight tubular member connected to a sterile fluid source, a second substantially straight tubular member positioned adjacent to and in parallel alignment with said first tubular member, the adjacent openings of said first and second tubular members being fused to form a common passageway for receiving a catheter, the remaining opening of said second tubular member being adapted to pass said sterile fluid to a waste container, said first and second tubular members being formed of a flexible material to permit manual manipulation of said tubular members for removal of constrictions occurring in said apparatus during the irrigation operation, pressure indicating means connected to said third opening for indicating the intracystic pressure of the urinary bladder, automatic means operatively connected to said irrigation apparatus for controlling the insertion and withdrawal of fluid in said first and third flexible means, said first and third means each having inner diameters greater than said second means, said automatic means having first and second stationary walls, said first and third means positioned between said walls, a reciprocating member positioned between said first and third members and an intermediate said walls, said reciprocating member being movable between a first and second position; said first member being clamped between said reciprocating member and said first wall when said reciprocating member is in said first position; said second member being clamped between said reciprocating member and said second wall when said reciprocating member is in said second position, electronic control means for moving said reciprocating member between said first and said second positions, said control means including adjustable means for generating a signal to control the time period during which said reciprocating member is in said second position, means for biasing said reciprocating member in said first position; said control means including means under control of said adjustable means output signal for overcoming said biasing means to move said reciprocating member to said second position, said adjustable means comprising a source of energy, switch means connected between said energy source to said control means; timing means for operating said switch means between an open and a closed position for controlling the connection of said energy source to said control means, said control means comprising a solenoid having an armature linked to said reciprocating member, said solenoid being connected to said switch means.

14. Irrigation apparatus for connecting a sterile fluid source and a waste container to a catheter comprising a first substantially straight tubular member connected to a sterile fluid source, a second substantially straight tubular member positioned adjacent to and in parallel alignment with said first tubular member, the adjacent openings of said first and second tubular members being fused to form a common passageway for receiving a catheter, the remaining opening of said second tubular member being adapted to pass said sterile fluid to a waste container, said first and second tubular members being formed of a flexible material to permit manual manipulation of said tubular members for removal of constrictions occurring in said apparatus during the irrigation operation, pressure indicating means connected to said third opening for automatic means operatively connected to said irrigation apparatus for controlling the insertion and withdrawal of fluid in said first and third flexible means, said first and third means, each having inner diameters greater than said second means, said automatic means having first and second stationary walls, said first and third means positioned between said walls, a reciprocating member positioned between said first and third members and an intermediate said walls, said reciprocating member being movable between a first and second position; said first member being clamped between said reciprocating member and said first wall when said reciprocating member is in said first position; said second member being clamped between said reciprocating member and said second wall when said reciprocating member is in said second position, electronic control means for moving said reciprocating member between said first and said second positions, said control means including adjustable means for generating a signal to control the time period during which said reciprocating member is in said second position, means for biasing said reciprocating member in said first position; and control means including means under control of said adjustable means output signal for overcoming said biasing means to move said reciprocating member to said second position, said adjustable means comprising a source of energy, switch means connected between said energy source to said control means; timing means for operating said switch means between an open and closed position for controlling the connection of said energy source to said control means, said control means comprising a solenoid having an armature linked to said reciprocating member, said solenoid being connected to said switch means, said timing means including a motor driven by said energy source, a cam rotated by said motor, first means on the periphery of said cam being positioned to abut said switch means at least once during a complete cycle of rotation.

15. Irrigation apparatus for connecting a sterile fluid source and a waste container to a catheter comprising a first substantially straight tubular member connected to a sterile fluid source, a second substantially straight tubular member positioned adjacent to and in parallel alignment with said first tubular member, the adjacent openings of said first and second tubular members being fused to form a common passageway for receiving a catheter, the remaining opening of said second tubular member being adapted to pass said sterile fluid to a waste container, said first and second tubular members being formed of a flexible material to permit manual manipulation of said tubular members for removal of constrictions occurring in said apparatus during the irrigation operation, pressure indicating means connected to said third opening for automatic means operatively connected to said irrigation apparatus for controlling the insertion and withdrawal of fluid in said first and third flexible means, said first and third means each having inner diameters greater than said second means, said automatic means having first and second stationary walls, said first and third means positioned between said walls, a reciprocating member positioned between said first and third members and an intermediate said walls, said reciprocating member being movable between a first and second position; said first member being clamped between said reciprocating member and said first wall when said reciprocating member is in said first position; said second member being clamped between said reciprocating member and said second wall when said reciprocating member is in said second position, electronic control means for moving said reciprocating member between said first and said second positions, said control means including adjustable means for generating a signal to control the time period during which said reciprocating member is in said second position, means for biasing said reciprocating member in said first position; and control means including means under control of said adjustable means output signal for overcoming said biasing means to move said reciprocating member to said second position, said adjustable means comprising a source of energy, switch means connected between said energy source to said control means; timing means for operating said switch means between an open and closed position for controlling the connection of said energy source to said control means, said control means comprising a solenoid having an armature linked to said reciprocating member, said solenoid being connected to said switch means, said timing means including a motor driven by said energy source, a cam rotated by said motor, first means on the periphery of said cam being positioned to abut said switch means at least once during a complete cycle of rotation, said switch means including an arm cooperating with said first means on said cam for closing said switch means when said first means abuts said arm; said arm being normally biased to retain said switch in its open position.

16. Irrigation apparatus for connecting a sterile fluid source and a waste container to a catheter comprising a first substantially straight tubular member connected to a sterile fluid source, a second substantially straight tubular member positioned adjacent to and in parallel alignment with said first tubular member, the adjacent openings of said first and second tubular members being fused to form a common passageway for receiving a catheter, the remaining opening of said second tubular member being adapted to pass said sterile fluid to a waste container, said first and second tubular members being formed of a flexible material to permit manual manipulation of said tubular members for removal of constrictions occurring in said apparatus during the irrigation operation, pressure indicating means connected to said third opening for automatic means operatively connected to said irrigation apparatus for controlling the insertion and withdrawal of fluid in said first and third flexible means, said first and third means each having inner diameters greater than said second means, said automatic means having first and second stationary walls, said first and third means positioned between said walls, a reciprocating member positioned between said first and third members and an intermediate said walls, said reciprocating member being movable between a first and second position; said first member being clamped between said reciprocating member and said first wall when said reciprocating member is in said first position; said second member being clamped between said reciprocating member and said second wall when said reciprocating member is in said second position, electronic control means for moving said reciprocating member between said first and said second positions, said control means including adjustable means for generating a signal to control the time period during which said reciprocating member is in said second position, means for biasing said reciprocating member in said first position; and control means including means under control of said adjustable means output signal for overcoming said biasing means to move said reciprocating member to said second position, said adjustable means comprising a source of energy, switch means connected between said energy source to said control means; timing means for operating said switch means between an open and closed position for controlling the connection of said energy source to said control means, said control means comprising a solenoid having an armature linked to said reciprocating member, said solenoid being connected to said switch means, said timing means including a motor driven by said energy source, a cam rotated by said motor, first means on the periphery of said cam being positioned to abut said switch means at least once during a complete cycle of rotation, said switch means including an arm cooperating with said first means on said cam for closing said switch means when said first means abuts said arm; said arm being normally biased to retain said switch in its open position, said cam first means being adapted to adjust the length of time the first means abuts said switch arm and for controlling the number of times said cam abuts said switch arm in one cycle of rotation.

17. Electronic valve control means comprising a housing, first and second stationary members projecting from said housing and positioned to receive first and second conduits therebetween; said housing having a slot between said first and second members substantially perpendicular to said members; a valve control member extending through said slot and mounted to reciprocate between said first and second members; bias means for urging said valve control member towards one of said stationary members; electronic means for moving said valve control member towards the other of said stationary members; timing means for energizing said electronic means at predetermined times; said timing means including manually settable control means adjustable to alter the length of the timing cycle of said timing means; said control means comprising a rotating means, a shaft connected to said rotating means, a plurality of discs secured to said shaft and rotatable therewith; each of said discs having projections along its periphery; switch means biased to an open position mounted in close proximity to said discs; manually operable means for positioning said switch means in a plurality of discrete positions, each of said positions being associated with one of said discs; the disc projections of each of said discs being adapted to engage said switch means when said switch means is placed in the discrete positions associated with said discs; said switch means being moved to the closed position when engaged by said projections; the number of projections on each disc being different from the number of projections on the remaining discs for generating a plurality of timing cycles of varying length.

18. Electronic valve control means comprising a housing, first and second stationary members projecting from said housing and positioned to receive first and second conduits therebetween; said housing having a slot between said first and second members substantially perpendicular to said members; a valve control member extending through said slot and mounted to reciprocate between said first and second members; bias means for urging said valve control member towards one of said stationary members; electronic means for moving said valve control member towards the other of said stationary members; timing means for energizing said electronic means at predetermined times; said timing means including manually settable control means adjustable to alter the length of the timing cycle of said timing means; said control means comprising a rotating means, a shaft connected to said rotating means, a plurality of discs secured to said shaft and rotatable therewith; each of said discs having projections along its periphery; switch means biased to an open position mounted in close proximity to said discs; manually operable means for positioning said switch means in a plurality of discrete positions, each of said positions being associated with one of said discs; the disc projections of each of said discs being adapted to engage said switch means when said switch means is placed in the discrete positions associated with said discs; said switch means being moved to the closed position when engaged by said projections; the number of projections on each disc being different from the number of projections on the remaining discs for generating a plurality of timing cycles of varying length; auxiliary means for engaging said switch means regardless of the timing cycle being employed; said auxiliary means comprising a pivotally mounted member movable between a first and second position; a first end of said member extending through a slot in said housing; the opposite end of said member being connected to said switch means; said movable member being adapted to close said switch means when in said second position; means for locking said movable member in said second position.

19. Electronic valve control means comprising a housing, first and second stationary members projecting from said housing and positioned to receive first and second conduits therebetween; said housing having a slot between said first and second members substantially perpendicular to said members; a valve control member extending through said slot and mounted to reciprocate between said first and second members; bias means for urging said valve control member towards one of said stationary members; electronic means for moving said valve control member towards the other of said stationary members; timing means for energizing said electronic means at predetermined times; said timing means including manually settable control means adjustable to alter the length of the timing cycle of said timing means; said control means comprising a rotating means, a shaft connected to said rotating means, a plurality of discs secured to said shaft and rotatable therewith; each of said discs having projections along its periphery; a plurality of switch means associated with each disc, each switch means being biased to an open position mounted in close proximity to said discs; manually operable means for selecting one of said switch means in a plurality of discrete positions, each of said positions being associated with one of said switches; the disc projections of each of said discs being adapted to engage its said associated switch means when said switch means is placed in the discrete positions associated with said discs; said switch means being moved to the closed position when engaged by said projections; the number of projections on each disc being different from the number of projections on the remaining discs for generating a plurality of timing cycles of varying length.

References Cited in the file of this patent

UNITED STATES PATENTS

| | | |
|---|---|---|
| 6,655 | Eastman | Sept. 21, 1875 |
| 1,209,846 | Kells | Dec. 26, 1916 |
| 1,317,851 | Arnett | Oct. 7, 1919 |
| 1,954,261 | Pierce | Apr. 10, 1934 |
| 2,254,833 | Ashkenaz | Sept. 2, 1941 |
| 2,478,876 | Nelson | Aug. 9, 1949 |
| 2,486,405 | Henderson | Nov. 1, 1949 |
| 2,663,477 | Bendz | Dec. 22, 1953 |
| 2,825,922 | Murray | Mar. 11, 1958 |
| 2,946,346 | Mead | July 26, 1960 |
| 3,031,102 | Storms | Apr. 24, 1962 |
| 3,042,042 | Blanck | July 3, 1962 |
| 3,049,142 | Oliver | Aug. 14, 1962 |